June 10, 1930. G. L. PEAKES 1,762,736
TWIST DRILL
Filed Oct. 23, 1926
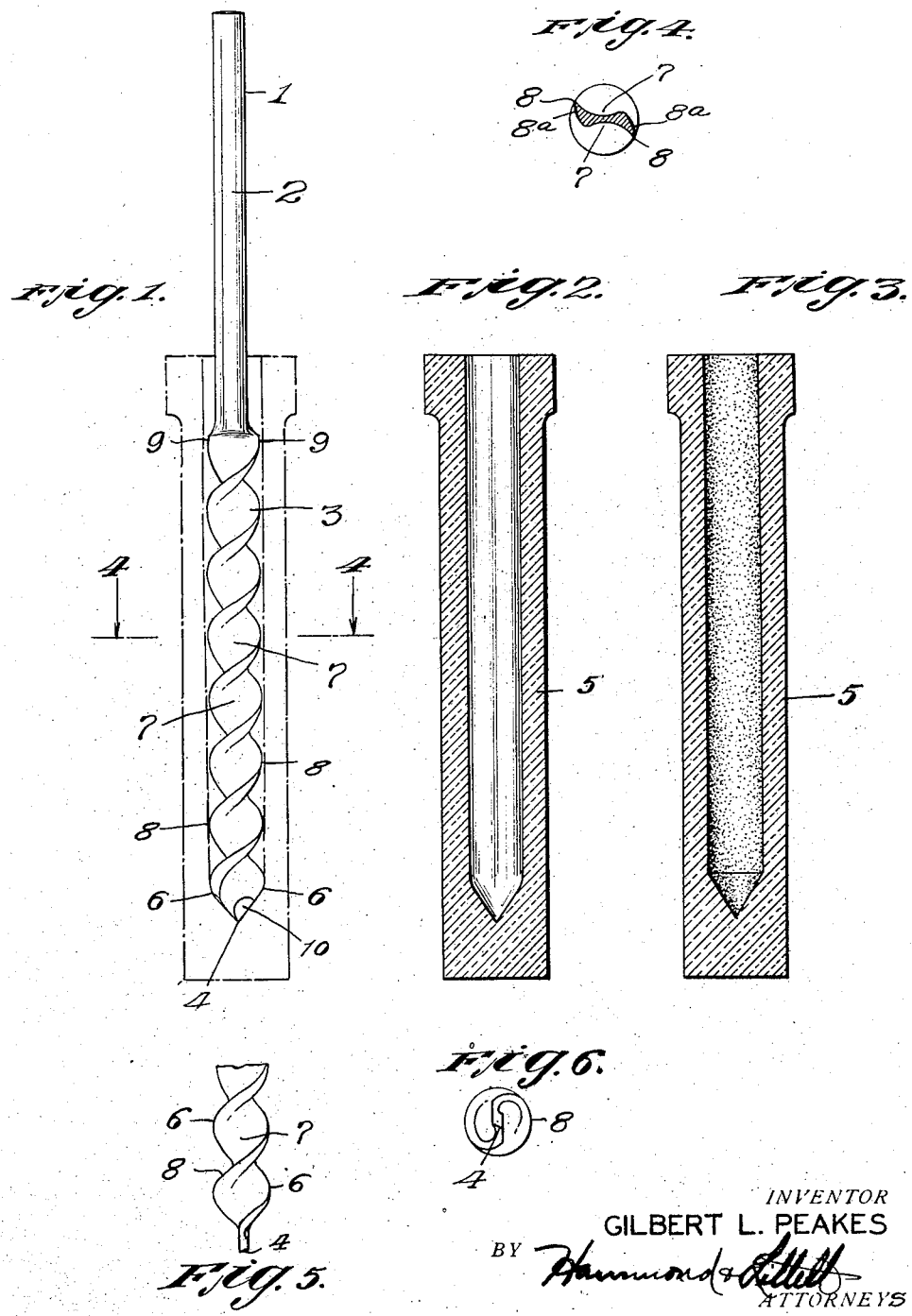
INVENTOR
GILBERT L. PEAKES Patented June 10, 1930

1,762,736

UNITED STATES PATENT OFFICE

GILBERT L. PEAKES, OF BLOOMFIELD, NEW JERSEY, ASSIGNOR TO BAKELITE CORPORATION, OF NEW YORK, N. Y., A CORPORATION OF DELAWARE

TWIST DRILL

Application filed October 23, 1926. Serial No. 143,557.

This invention relates to drills or drill bits for drilling holes, particularly in phenolic condensation products, such as bakelite, redmanol, etc., or in celluloid, hard rubber, casein, and the like.

The ordinary twist drill used in metal working is not suitable for drilling in transparent bakelite, redmanol, etc., because of the rough appearance of the hole produced by it, which destroys the transparency of the material where the hole is drilled and makes an article of unsightly appearance. Furthermore, due to the design of the ordinary twist drill, an excessive amount of heat is generated in drilling bakelite, or the like, which tears the surface of the hole, clogs the drill, makes inaccurate holes and often breaks the drill or splits the material.

One of the objects of the invention is to provide a drill which is especially adapted for drilling in bakelite, redmanol, celluloid, casein products and the like.

A special object of this invention is to provide a drill for drilling holes in transparent varieties of the above named substances without marring or clouding the surface of the hole or destroying the transparency of the material where the hole is drilled, or splitting the material.

Another object is to provide a drill for drilling holes in bakelite, redmanol and the like, which can be fed rapidly into the work, and will discharge the chips and cuttings as rapidly as they are formed. This feature of my invention is of special advantage in drilling bakelite or the like, as the construction of the ordinary metal-cutting twist drill is such that it will not discharge the bakelite chips as rapidly as they are formed, making it necessary to withdraw the drill from the hole at frequent intervals to remove the chips which have accumulated therein.

This is an important advantage in the use of my drill on automatic or semi-automatic drilling machines as it permits the drills to be fed uniformly into the work to the desired depth and withdrawn when the hole is completed, whereas with the use of ordinary metal-cutting twist drills, it is necessary to provide special cams to withdraw the drills at frequent intervals to discharge the chips.

In the drilling or cutting of bakelite, and the like, exceedingly voluminous chips are formed which expand greatly under the heat of cutting and the heat generated by the friction between the lands of the ordinary drill and the walls of the hole. The bakelite, or other material, although infusible, is softened by the heat of the cutting, and in the use of the ordinary metal twist drill the walls of the hole are torn or roughly abraded as the metal and chips are forced over the soft, warm surface. By providing a drill which affords maximum room for the voluminous chips and will discharge them rapidly, and which has no lands rubbing against the walls of the hole, I am able to make a "cooler" cut and therefore avoid softening and burning or tearing the walls of the hole.

Other objects and advantages will be pointed out in the specification which together with the accompanying drawings discloses a drill capable of securing the object set forth above.

Referring to the drawings;

Figure 1 is an outline perspective view of my improved drill as used in drilling a hole in a transparent block of bakelite.

Figure 2 is a sectional view of the drilled cylinder, illustrating in perspective the smooth unclouded appearance of the wall of the hole.

Figure 3 is a view similar to Figure 2, showing the clouded appearance of a similar piece of bakelite when the hole is drilled by an ordinary metal twist drill.

Figure 4 is a sectional view of the drill on the line 4—4 of Figure 1.

Figures 5 and 6 are a side view and an end view, respectively, of the tip of the drill.

The drill bit, which may be of any desired size, is indicated at 1 and consists of a shank 2, a twisted portion 3 and a point 4. The block of bakelite which is being drilled is indicated in outline at 5.

The corners of the point are rounded at 6 on a comparatively large radius and with a long taper to the point calculated to take a thicker chip from the tapered wall of the bottom of the hole and to avoid the objection to the ordinary twist drill whose sharp corners have a tendency to give a scratchy screw thread appearance to the walls of the hole. The point is ground with a front rake suitable to the material being drilled. For bakelite a zero rake is used, as indicated at 10, to avoid a chipping cut in the bakelite. For celluloid a slight rake is desirable.

The bakelite and other organic chips or cuttings are not ordinarily of sufficient strength to push themselves up the flute of the drill and out of the hole as steel cuttings do, so that it is desirable to use the convolutions of the drill to elevate or discharge the cuttings from the hole. To facilitate the discharge of the cuttings, and prevent the friction between the chips and drill and the walls of the hole from scratching and clouding the hole, the flute 7, of the drill, is given a high polish and the pitch is reduced to approximately two diameters, or approximately 33° to the axis in order to reduce the incline along which the chips must travel. A pitch of two to four diameters or 32° to 52° may, however, be used.

To further facilitate the discharge of the cuttings and keep the drilling heat as low as possible, the thickness of the metal in the web, namely, between the point 7 in the valley or flute and the same point 7 in the diametrically opposite flute, is reduced, throughout the length of the drill which gives a larger and uniform space in the valley or flute through which the cuttings may travel, than can be given in the twist drills for metal because in those drills enough metal must be retained in the web to insure adequate strength for drilling in metal whereas a bakelite drill requires less strength but produces more voluminous cuttings or chips.

The drill is tapered directly from the ridges 8 toward the center of the flute 7 as shown by the angle line 8ª, thus eliminating the land of the ordinary drill, as it has been found that these lands rubbing against the surface of the walls of the hole generate heat and permit the bakelite cuttings to slip between them and the walls of the hole, which also creates considerable friction and causes burning, tearing and clouding of the walls of the hole.

To further prevent scratching or clouding the hole, the drill has considerable taper back from the rounded point 6 as illustrated at 9 which will allow the drill to run eccentrically or diagonally through the material without the shank of the drill or the ridges 8 back of the cutting point catching on the surface of the hole and causing chattering. This reduced diameter or taper back of the point also prevents the drill catching like a screw and feeding itself into the work at a higher rate because of its own pitch. The shank is of smaller diameter than the fluted portion of the drill in order to allow a hole of greater depth than the fluted portion to be drilled.

One method of making a drill of this type is to flatten a portion of a round rod by forging or otherwise, tapering the flattened portion outwardly from the rod to the end. Each edge of the flattened portion is then cut back from the ridges 8 to eliminate the lands, the flattened portion uniformly twisted to produce a pitch of about two diameters, the rounded corners 6 ground, the tip sharpened and the chip space polished. It will be understood, however, that the drill may be made by machining from a rod, grinding down from a wood bit or in any other suitable manner.

The smooth glazed appearance of the walls of the hole produced by my drill in a block of bakelite 5 is illustrated in Figure 2, and in contrast thereto the clouded or scratched appearance of the hole produced by the ordinary drill in a similar block of bakelite 5 is illustrated in Figure 3.

While my drill is especially adapted for drilling clear holes in transparent bakelite and other organic materials, it is also superior to prior drills for drilling all types of plastic or organic substances where the dimensions, structure, or appearance would be damaged by the heating effect of imperfect drilling, and its useful application is not limited to transparent varieties of these substances. The drill works with equal facility when the work is stationary and the drill rotated or when the work is rotated and the drill held stationary.

Various modifications may be made from the described construction and points now considered essential or desirable may be found unessential and be omitted from the drill without departing from the spirit and scope of the invention as defined in the appended claims.

What I claim as my invention is:

1. As an article of manufacture, a twist drill sharpened with substantially zero rake and having no lands adapted especially to produce a hole with unclouded walls in a piece of bakelite or other transparent organic material.

2. A twist drill with sharp ridges, a gradual slope from the ridges to the flute, a polished flute of reduced section, a taper back from the point and a rounded point with substantially zero rake.

3. As an article of manufacture, a twist drill adapted especially to produce a hole in a piece of bakelite or other organic material, having sharp ridges, a gradual slope from the ridges to the flute, a polished flute of reduced section, a taper back from the point, a rounded point with zero rake, and a shank of smaller diameter than the twisted portion.

In testimony whereof I have affixed my signature to this specification.

GILBERT L. PEAKES.